(12) United States Patent
Buis et al.

(10) Patent No.: US 7,937,213 B2
(45) Date of Patent: May 3, 2011

(54) METHOD FOR CONTROLLING AN ENGINE PROVIDED WITH AN EXHAUST GAS RECYCLING LOOP

(75) Inventors: Emmanuel Buis, Sceaux (FR); Michel Leporcq, Epinay sur Orge (FR)

(73) Assignee: Renault S.A.S., Boulogne Billancourt (FR)

( * ) Notice: Subject to any disclaimer, the term of this patent is extended or adjusted under 35 U.S.C. 154(b) by 329 days.

(21) Appl. No.: 12/096,182

(22) PCT Filed: Dec. 4, 2006

(86) PCT No.: PCT/FR2006/051273
§ 371 (c)(1),
(2), (4) Date: Dec. 8, 2008

(87) PCT Pub. No.: WO2007/066033
PCT Pub. Date: Jun. 14, 2007

(65) Prior Publication Data
US 2009/0199824 A1 Aug. 13, 2009

(30) Foreign Application Priority Data
Dec. 8, 2005 (FR) ..................... 05 12453

(51) Int. Cl.
*G06F 19/00* (2006.01)
*F02M 25/07* (2006.01)
*F02B 47/08* (2006.01)
*F01N 1/00* (2006.01)

(52) U.S. Cl. ...... 701/114; 701/108; 60/324; 123/568.16

(58) Field of Classification Search ............. 123/568.11, 123/568.12, 568.16, 568.21; 701/101–103, 701/108, 114, 115; 60/324; 74/114.74
See application file for complete search history.

(56) References Cited

U.S. PATENT DOCUMENTS

| 6,408,834 | B1 | 6/2002 | Brackney et al. | |
|---|---|---|---|---|
| 6,543,427 | B2 * | 4/2003 | Kawasaki | 60/324 |
| 6,687,601 | B2 * | 2/2004 | Bale et al. | 701/108 |
| 6,742,331 | B2 * | 6/2004 | Minami | 60/287 |
| 6,842,690 | B2 * | 1/2005 | Akao et al. | 701/114 |
| 6,862,878 | B2 * | 3/2005 | Ries-Mueller | 60/324 |
| 6,865,882 | B2 * | 3/2005 | Minami | 60/295 |
| 7,107,761 | B2 * | 9/2006 | Fukuma et al. | 123/568.21 |
| 2004/0206074 | A1 * | 10/2004 | Akao et al. | 60/324 |
| 2010/0313858 | A1 * | 12/2010 | Springer et al. | 123/568.11 |

FOREIGN PATENT DOCUMENTS

| JP | 08 093510 | | 4/1996 |
|---|---|---|---|
| JP | 2000337172 | A * | 12/2000 |
| JP | 2001 207917 | | 8/2001 |
| JP | 2002276405 | A * | 9/2002 |

* cited by examiner

*Primary Examiner* — Willis R Wolfe, Jr.
(74) *Attorney, Agent, or Firm* — Oblon, Spivak, McClelland, Maier & Neustadt, L.L.P.

(57) ABSTRACT

An engine control, and in particular a method for controlling an engine including a low-pressure exhaust gas recycling loop. The method adjusts a predetermined engine operating parameter by controlling the position of an exhaust gas recycling valve, which is placed in the loop, for determining whether the predetermined measured quantity of the valve respects a predetermined criteria, and controls the position of an exhaust shutter, which is arranged outside the loop, when the quantity does not respect the criteria.

10 Claims, 2 Drawing Sheets

1

METHOD FOR CONTROLLING AN ENGINE PROVIDED WITH AN EXHAUST GAS RECYCLING LOOP

Figure 1:
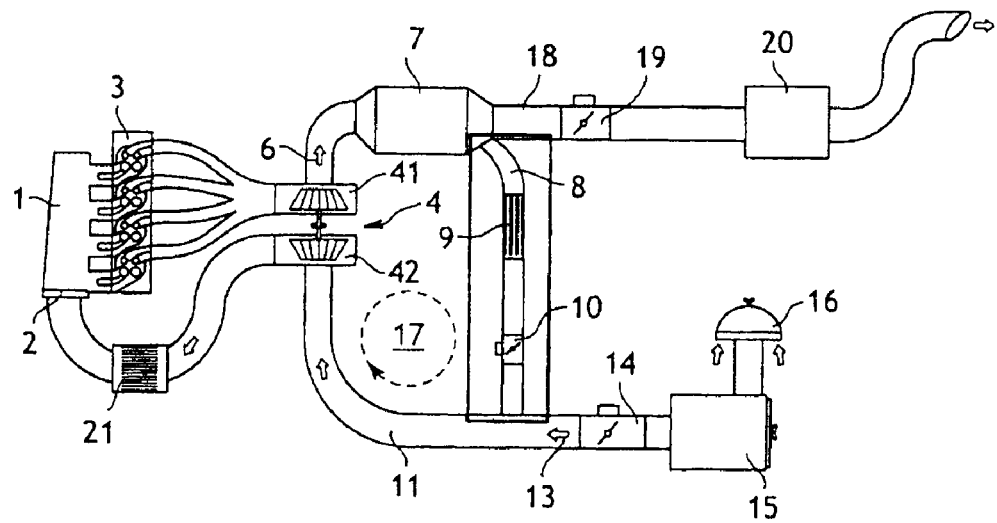

The invention relates to a method for controlling an engine of a vehicle, especially a motor vehicle.

In particular, the invention relates to a method applied to an engine provided with an exhaust gas recirculation system and, yet more particularly, provided with a recirculation loop of the low-pressure type.

An engine of this type is already known.

It typically comprises an engine block having an exhaust and intake manifold.

Following the route of the exhaust gases, the exhaust manifold is connected to a turbine of a turbocharger.

The gases possess an energy capable of turning the turbine and a supercharger fixedly connected thereto.

The gases passing through the turbine are evacuated towards a particulate filter so as there to undergo a treatment which is known per se.

Upon exit from this filter, a part at least of the treated gases is recirculated with the aid of the aforesaid loop, whilst the other part continues in an exhaust pipe towards an exhaust shutter and a silencer.

In the low-pressure recirculation loop, a cooler allows a temperature of the recirculated gases to be advantageously lowered.

In addition, a recirculation valve disposed downstream of the cooler allows the flow of these gases to be controlled.

It will here be noted that this flow is likewise controlled by an intake shutter.

In fact, the latter is capable of modifying a pressure difference of the gases at the boundaries of the valve, which leads to the flow being modified.

The recirculated gases then emerge in a pipe in which air originating from an air inlet and an air filter circulates.

The thus constituted gas mixture is then directed towards the intake manifold of the engine, passing through the supercharger and possibly a supercharging air cooler.

It is known that, compared especially to an engine equipped with a high-pressure recirculation system, such an engine offers performance which very well satisfies anti-pollution constraints imposed by, in particular, European standards.

In particular, it is known that this type of engine allows harmful emissions of nitrogen oxides (Nox) and polluting particles, such as soot particles, to be reduced still further.

Nevertheless, since their use is still recent, control methods truly suited to this type of engine are not previously known.

In particular, control methods which allow the air flow and/or the circulation rate to be better regulated as a function of a working state of the recirculation valve and the exhaust shutter are not previously known.

One object of the invention is therefore to eliminate these drawbacks.

To this end, a method for controlling an engine provided with an exhaust gas recirculation loop of the low-pressure type is proposed, characterized in that it comprises a step in which a predetermined working parameter of the engine is regulated by controlling a position of an exhaust gas recirculation valve disposed in the loop if the measurement of a predetermined variable of this valve satisfies a predetermined criterion, and by controlling a position of an exhaust shutter disposed outside this loop if said measurement fails to satisfy said criterion.

Preferred, but non-limiting aspects of this method are as follows:

2

- the predetermined working parameter of the engine is an exhaust gas recirculation rate;
- the predetermined parameter is an air flow intended to be mixed with the recirculated gas;
- the predetermined variable is the position of the valve and the satisfaction of the criterion consists in determining whether this position is less than an estimated threshold value;
- the position of the shutter and of the valve is determined by means of a single regulator, an amplification gain (Kp, Ki) of which is automatically chosen as a function of the result linked to the criterion;
- the threshold value is estimated from an engine speed and fuel flow mapper.

Also proposed according to the invention is an engine comprising an exhaust gas recirculation loop of the low-pressure type, means for regulating a working parameter of the engine, means for controlling a position of an exhaust gas recirculation valve disposed outside this loop, and means for measuring a predetermined variable of the valve, characterized in that the regulating means are designed to act upon the means for controlling the position of the valve if the measurement of the variable relating thereto satisfies a predetermined criterion, and upon the means for controlling the position of the shutter if said measurement fails to meet said criterion.

Preferred but non-limiting aspects of this engine are as follows:

- the predetermined working parameter of the engine is an exhaust gas recirculation rate;
- the predetermined parameter is an air flow intended to be mixed with the recirculated gas;
- the regulating means comprise a single regulator, an amplification gain (Kp, Ki) of which is automatically selected as a function of the result linked to the criterion.

Figure 2:
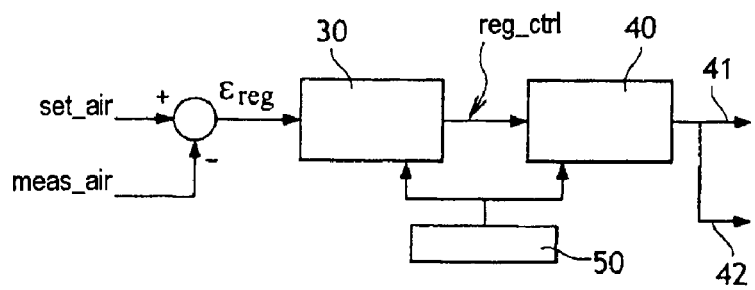
Figure 3:
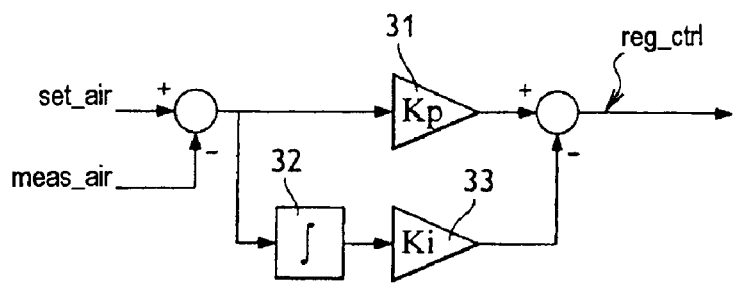
Figure 4:
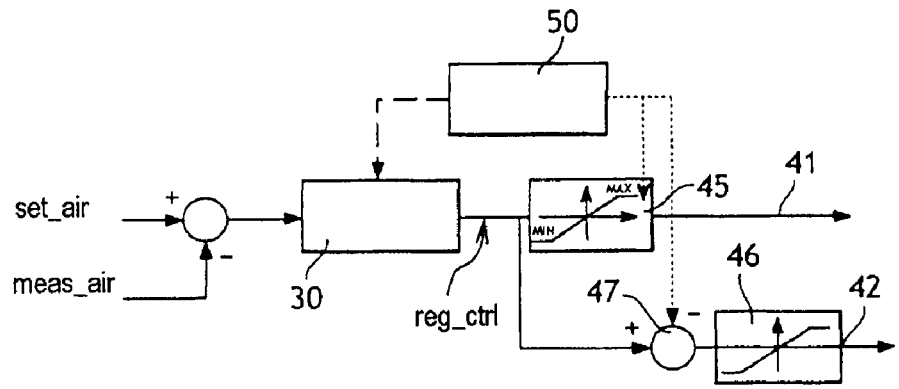
Figure 5:
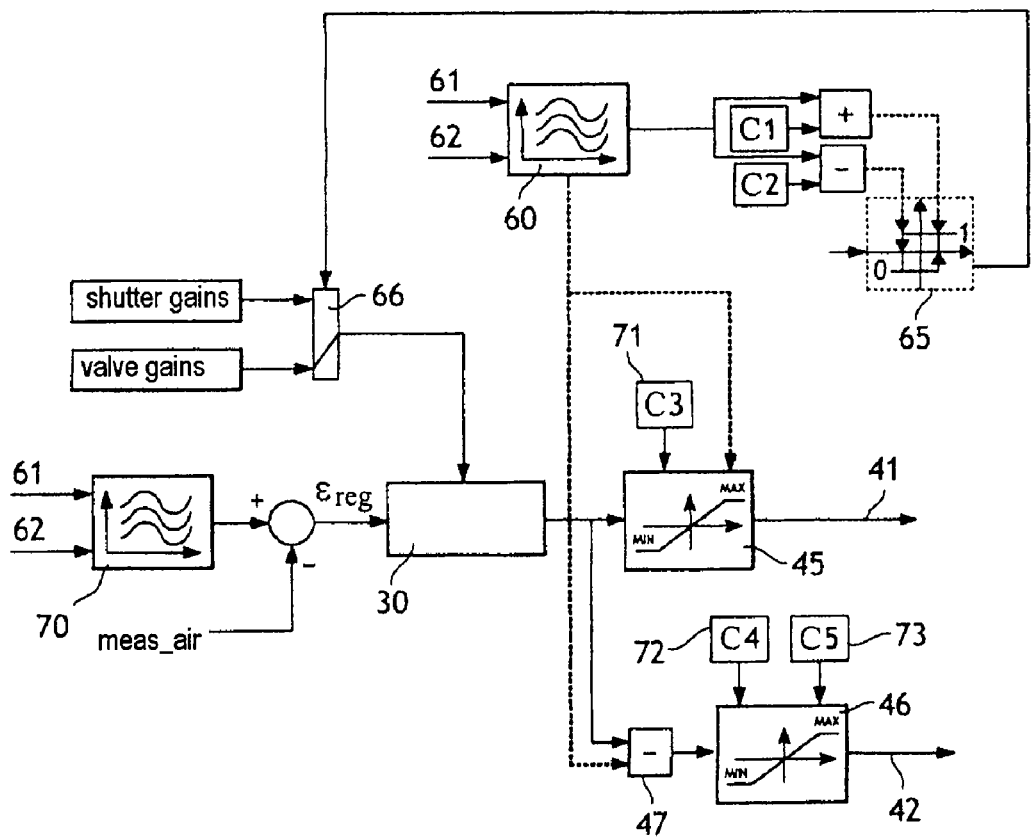

Other aspects, objects and advantages of the invention will become more clearly apparent from a reading of the following description of the invention, drawn up with reference to the appended drawings, in which:

FIG. 1 illustrates, by way of non-limiting example, an engine capable of implementing the method of the invention, FIG. 2 is a simplified diagram of a structure for regulating an air flow according to the invention, FIG. 3 shows a more detailed diagram of a regulator used in the structure of FIG. 2, FIG. 4 shows a more detailed diagram of a control signal separator used in the structure of FIG. 2, FIG. 5 is a diagram of a non-limiting example of a regulating structure according to the invention.

Referring to FIG. 1, an engine of the invention has been illustrated.

This engine comprises an engine block 1, an intake manifold 2 and exhaust manifold 3, and a turbocharger 4 made up of a turbine 41 and a supercharger 42.

Exhaust gases 6, which pass through the turbine 41, are directed towards a particulate filter 7, a by-pass pipe 8 of which allows at least a part of these gases to be recirculated towards the supercharger 42.

In this pipe 8, a cooler 9 and a recirculation valve 10 are capable of cooling and controlling a flow of these gases, respectively.

Moreover, this pipe 8 opens out into another pipe 11, in which the air 13 can circulate according to a flow controlled upstream by an air intake shutter 14.

It will be noted that this air traditionally originates from an air filter 15 connected to an air inlet 16.

The assembly made up of the pipe 8, the particulate filter 7, the turbocharger and the pipe 11 forms a low-pressure recirculation loop 17.

Also upon exit from the particulate filter 7, the exhaust gases which are not recirculated are evacuated in an exhaust pipe 18 containing an exhaust shutter 19 and a silencer 20.

The exhaust shutter 19, in cooperation with the valve 10, allows the flow of the recirculated gases, in particular, to be controlled.

It will here be noted that, as a result of the engine construction, it must be borne in mind that regulating this flow automatically amounts to regulating the rate of recirculation of the exhaust gases, generally referred to as the EGR rate.

In fact, these two variables are directly interconnected.

Finally, the engine illustrated by way of non-limiting example in said FIG. 1 typically comprises an air cooler 21 disposed between the supercharger 42 and the intake manifold 2.

Referring now to FIG. 2, an air flow regulating structure has been represented in general view.

The structure comprises a regulator 30, which admits as input a difference between an air flow measurement meas_air, realized by means of a sensor which is known per se, and an air flow set value set_air, worked out upstream of this regulator.

The regulator is capable of delivering a control signal reg_ctrl, which allows the EGR valve 10 and/or the exhaust shutter 19 to be controlled according to a predetermined criterion.

According to one aspect of the invention, the aforesaid control signal makes it possible to control an opening/closing position of the EGR valve 10 and of the shutter 19.

And the predetermined criterion concerns a working state of the EGR valve 10.

In particular, according to this aspect, the criterion consists in determining whether the position of the valve 10 is capable of providing a working which is deemed satisfactory.

By way of non-limiting example, it may be considered that a more than 60% opening of the EGR valve 10 is not suitable for regulating the air flow.

In this case, the method comprises means 50, which act upon the regulator 30 in order that the regulation is provided, at least substantially, by the exhaust shutter 19, and no longer by the EGR valve 10.

Thus, the means 50 allow the regulation, and in particular the regulator 30, to be adjusted according to whether the predetermined criterion is satisfied or not.

As further illustrated in FIG. 2, the means 50 act upon control signal separator 40.

This separator 40 converts the control signal reg_ctrl of the regulator 30 into two control signals 41 and 42.

The signal 41 is a signal for controlling the position of the EGR valve 10, whilst the signal 42 is a signal for controlling the position of the exhaust shutter 19.

The regulator 30 and the separator 40 will now be described in greater detail.

In this regard, FIG. 3 shows an embodiment of the regulator 30 in diagrammatic representation.

In this instance, the regulator in question is of the proportional-integral type, but the person skilled in the art will appreciate that other embodiments are clearly possible.

Traditionally, such a regulator comprises an amplification step 31 of gain Kp, an integration stage 32, and a second amplification stage of gain Ki associated with the integration stage 32.

According to the invention, the gains Kp and Ki can have different values chosen according to whether said predetermined criterion is satisfied or not, for example according to whether the EGR valve 10 has an opening position greater than 60%.

Thus, in this embodiment, it is not the structure of the regulator 30 that is changed according to the criterion, but rather the gain(s) used in this regulator.

In particular, according to the satisfaction of the predetermined criterion, gains Kp and Ki suited to the EGR valve 10 and to the exhaust shutter 19 are used.

FIG. 4 shows an embodiment of the set value separator 40 in diagrammatic representation.

This comprises two units 45 and 46, which each define a range of values for which the EGR valve 10 and the shutter 19 are supposed to correctly regulate the air flow.

In the unit 45, for example, the range is defined between two saturation plateaus MIN and MAX of the valve 10.

More precisely, according to the same figure, it can be seen that the separator comprises a subtracter unit 47, which subtracts from the signal reg_ctrl delivered by the regulator 30 a value supplied by the means 50.

This value defines at least an upper limit of at least one of the aforesaid ranges, in the case according to the figure the range of the unit 45.

The difference obtained at the output of the subtracter unit 47 is then injected into the unit 46.

Such an implementation allows the signal 41 or 42 to be delivered according to the value of the control signal reg_ctrl as a function of the aforesaid ranges.

By way of non-limiting example, let us assume that the value supplied by the means 50 is equal to 100.

Let us further assume that the value of the signal reg_ctrl is equal to 80, therefore less than MAX.

In this case, the value of this signal is within the range of the unit 45.

Furthermore, this value 80 subtracted from the value 100 by the unit 47 gives −20.

This value 80 is therefore contained within the range of the unit 46, but, being negative, it is felt that it is not bound to impact upon the exhaust shutter position.

Let us now assume that value of the signal reg_ctrl is equal to 110.

In this case, it is no longer contained within the range of the unit 45, so that the signal reg_ctrl no longer corresponds to the signal 41.

Moreover, at the output of the unit 47, the value 10 is obtained, which is this time positive and is within the range of the unit 46.

Hence, it is now the signal 42 which corresponds to the signal reg_ctrl.

And the regulation of the air flow is then provided by the exhaust shutter 19, and no longer by the EGR valve 10.

In particular, in order to continue to increase the air flow, the regulator will deliver the signal 42 such as to close the exhaust shutter a little more.

At the same time, the EGR valve 10 will maintain the position which it had at the point of departure from the range of the unit 45.

In other words, it will remain in a state regarded as saturated.

Referring now to FIG. 5, a non-limiting example of a complete regulating structure according to the invention has been represented.

In this figure can be found, in particular, the regulator 30 and the units 45, 46 and 47.

It can also be seen how the value is established which serves in particular to define said upper limit of the range of the unit 45.

In fact, according to a preferred aspect of the invention, a mapper 60 in terms of engine speed 61 and fuel flow 62 of the position of the EGR valve 10 is used.

This mapper 60 additionally serves indirectly to choose the appropriate gains Kp and Ki.

More precisely, an output of the mapper 60 is compared to a measurement meas_pos_EGR of the position of the EGR valve 10.

To this end, from, a standard hysteresis diagram 65 can be constructed for example, two constants C1 and C2 and from the output of the mapper 60, to which diagram the measurement meas_pos_EGR is compared.

The result of this comparison allows an appropriate set of values to be activated for the gains Ki and Kp.

Such a selection is realized in a unit 66.

This receives at the input said result, as well as at least one set of values for the gains Ki and Kp of the valve 10 and of the shutter 19.

It additionally delivers a signal which acts upon the regulator 30.

For example, this signal operates an update of the gains Kp and Ki in stages 31 and 33.

Thus, if the above-given example is considered, when the measurement meas_pos_EGR shows that the opening of the valve 10 is less than 60%, a value supplied by the mapper 60, the unit 65 sends the unit 66 a signal which leads it to select a set of parameters appropriate for controlling the valve 10.

Conversely, when the measurement meas_pos_EGR shows that the opening of the valve 10 is greater than 60%, the unit 65 sends the unit 66 a signal which leads it to select a set of parameters appropriate for controlling the shutter 19, and no longer for controlling the valve 10.

As further illustrated in FIG. 5, the set value of the air flow, which is inputted to the structure and is compared to the measurement of the air flow, has a value which is read off from a mapper 70 of engine speed 61 and fuel flow 62.

Moreover, the units 71, 72 and 73 define constants C3, C4 and C5, which themselves define a bottom limit of the range of the units 45 and 46 and a top limit of the range of the unit 46.

It will here be noted that in FIG. 5, the units on a white background have been defined during a calibration, for example a calibration of the engine on a roller-type test stand.

Of course, the invention is by no means limited to the embodiment presented above.

In particular, the predetermined parameter of the engine which is regulated can correspond to the rate of recirculation of the exhaust gases.

In this regard, the regulating structure no longer admits at the input a measurement and an air flow set value, but an estimate and a recirculation rate set value.

In order to obtain said estimate, various solutions will be able to be envisaged.

A first solution consists in using a temperature sensor for fresh air which is not yet mixed with the recirculated gases emanating from the low-pressure recirculating loop.

In addition, use is made of a temperature sensor for the recirculated gases just prior to the mixture, and a temperature sensor for the mixture after the low-pressure recirculating loop.

A second solution consists in using a temperature sensor for the mixture present in a plenum chamber of the engine with a pressure sensor for this mixture.

In addition, a sensor-based measurement or an estimate of the air flow is used, according to choice.

The person skilled in the art will appreciate that other variants of the invention also exist.

In particular, consideration may also be given to the regulation of the air flow and/or of the rate of recirculation being firstly realized with the exhaust shutter 19, and then with the EGR valve 10, when the predetermined criterion relating to the shutter, this time, is no longer satisfied.

The invention claimed is:

1. A method for controlling an engine including an exhaust gas recirculation loop of low-pressure type, comprising:
   regulating a predetermined working parameter of the engine by controlling a position of an exhaust gas recirculation valve disposed in the loop if a measurement of a predetermined variable of the valve satisfies a predetermined criterion; and
   controlling a position of an exhaust shutter disposed outside the loop if the measurement fails to satisfy the criterion.

2. The control method as claimed in claim 1, wherein the predetermined working parameter is an exhaust gas recirculation rate.

3. The control method as claimed in claim 1, wherein the predetermined working parameter is an air flow intended to be mixed with the recirculated gas.

4. The control method as claimed in claim 1, wherein the position of the shutter and of the valve is determined by a single regulator, an amplification gain of which is automatically chosen as a function of the result linked to the criterion.

5. The control method as claimed in claim 1, wherein the predetermined variable is a position of the valve, and wherein satisfaction of the criterion includes determining whether the position is less than an estimated threshold value.

6. The control method as claimed in claim 5, wherein the threshold value is estimated from an engine speed and fuel flow mapper.

7. An engine comprising:
   an exhaust gas recirculation loop of low-pressure type;
   means for regulating a predetermined working parameter of the engine;
   means for controlling a position of an exhaust gas recirculation valve disposed within the loop and a position of an exhaust shutter disposed outside the loop; and
   means for measuring a predetermined variable of the valve,
   wherein the means for regulating acts upon the means for controlling the position of the valve if the measurement of the variable relating thereto satisfies a predetermined criterion, and upon the means for controlling the position of the shutter if the measurement fails to meet the criterion.

8. The engine as claimed in claim 7, wherein the predetermined working parameter is an exhaust gas recirculation rate.

9. The engine as claimed in claim 7, wherein the predetermined working parameter is an air flow intended to be mixed with the recirculated gas.

10. The engine as claimed in claim 7, wherein the means for regulating comprises a single regulator, an amplification gain of which is automatically selected as a function of the result linked to the criterion.

* * * * *